Feb. 11, 1964
C. E. SWING ETAL
3,120,783
FILM READER
Filed Sept. 11, 1961
5 Sheets-Sheet 1
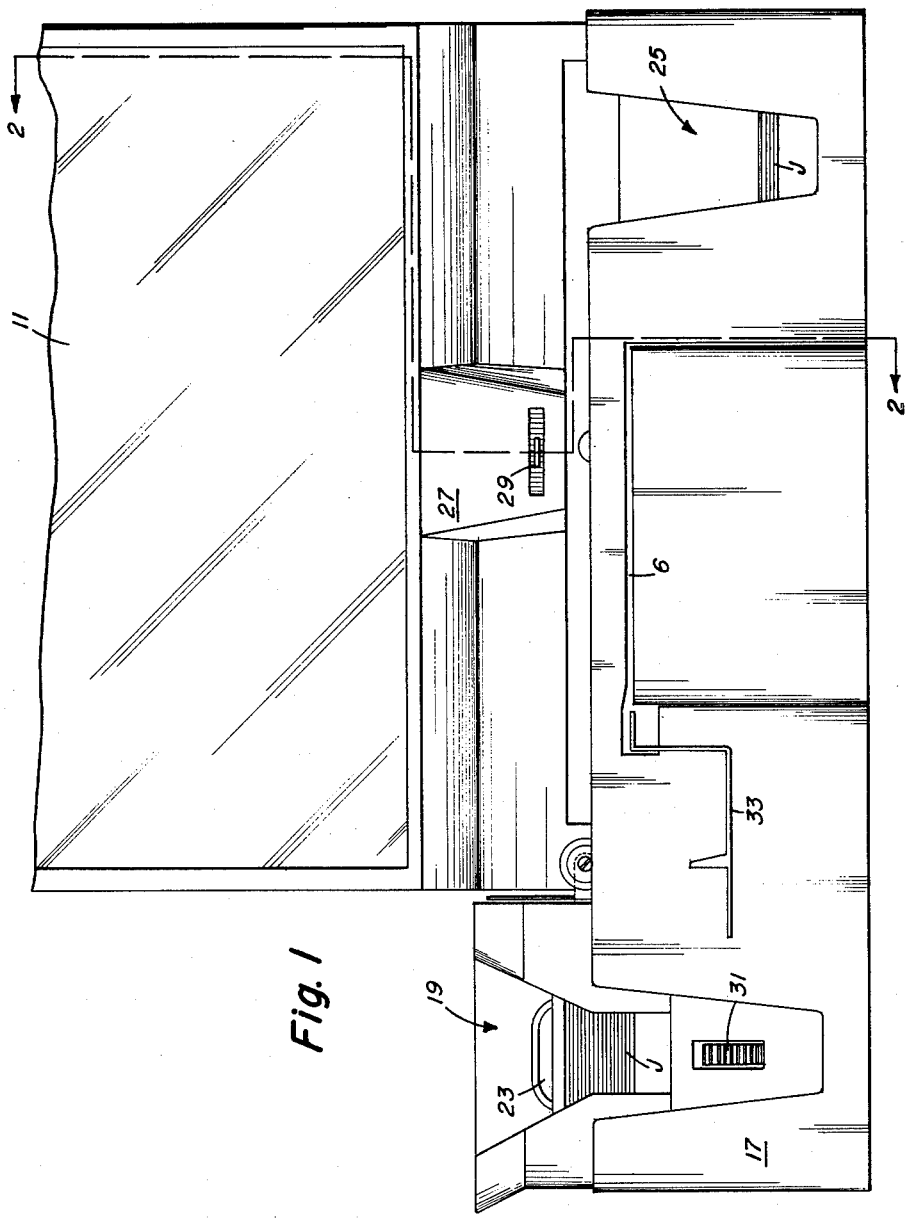
CHARLES E. SWING
ELMER O. WANGERIN
INVENTORS
BY R. Frank Smith
Paul R. Holmes
ATTORNEYS

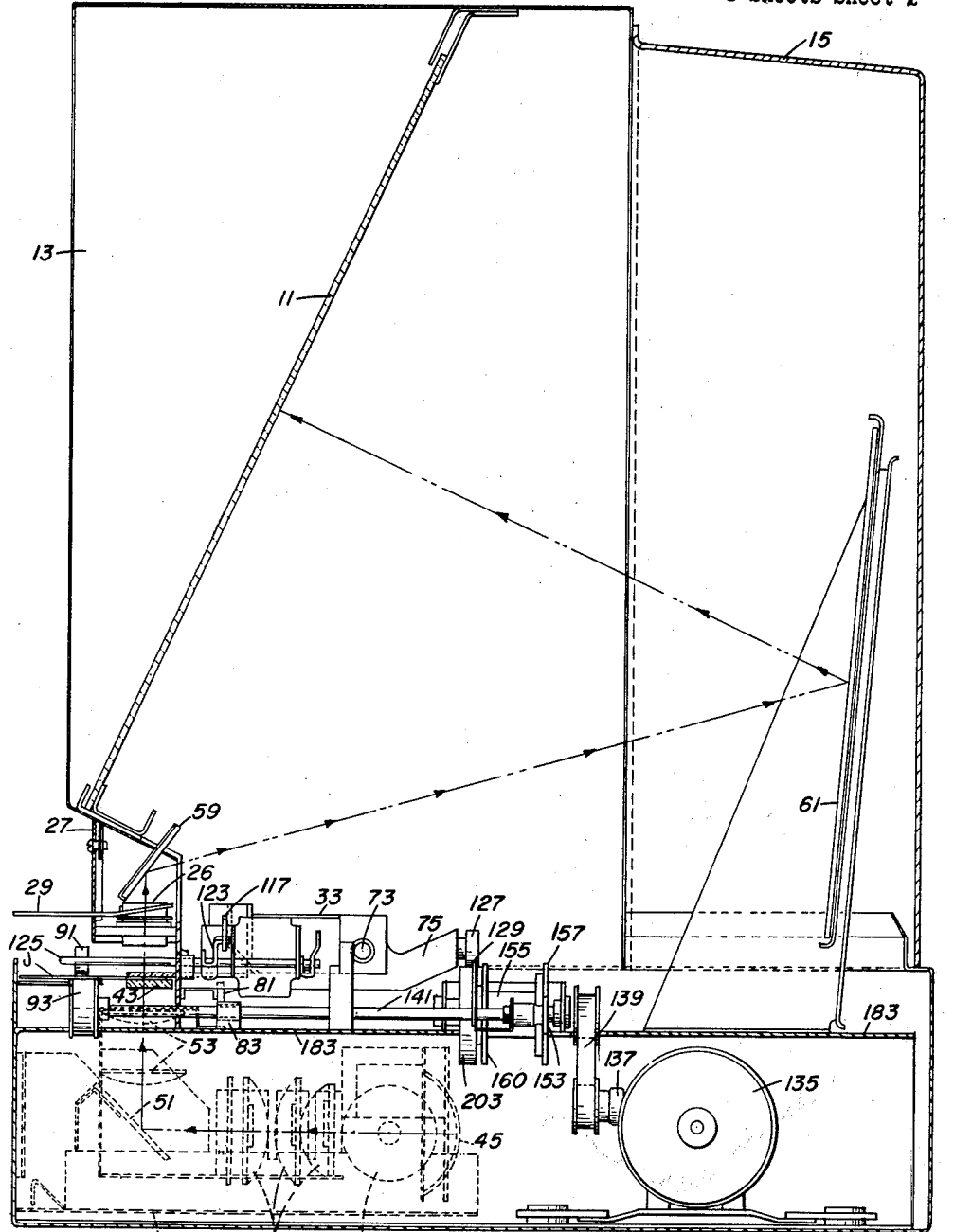

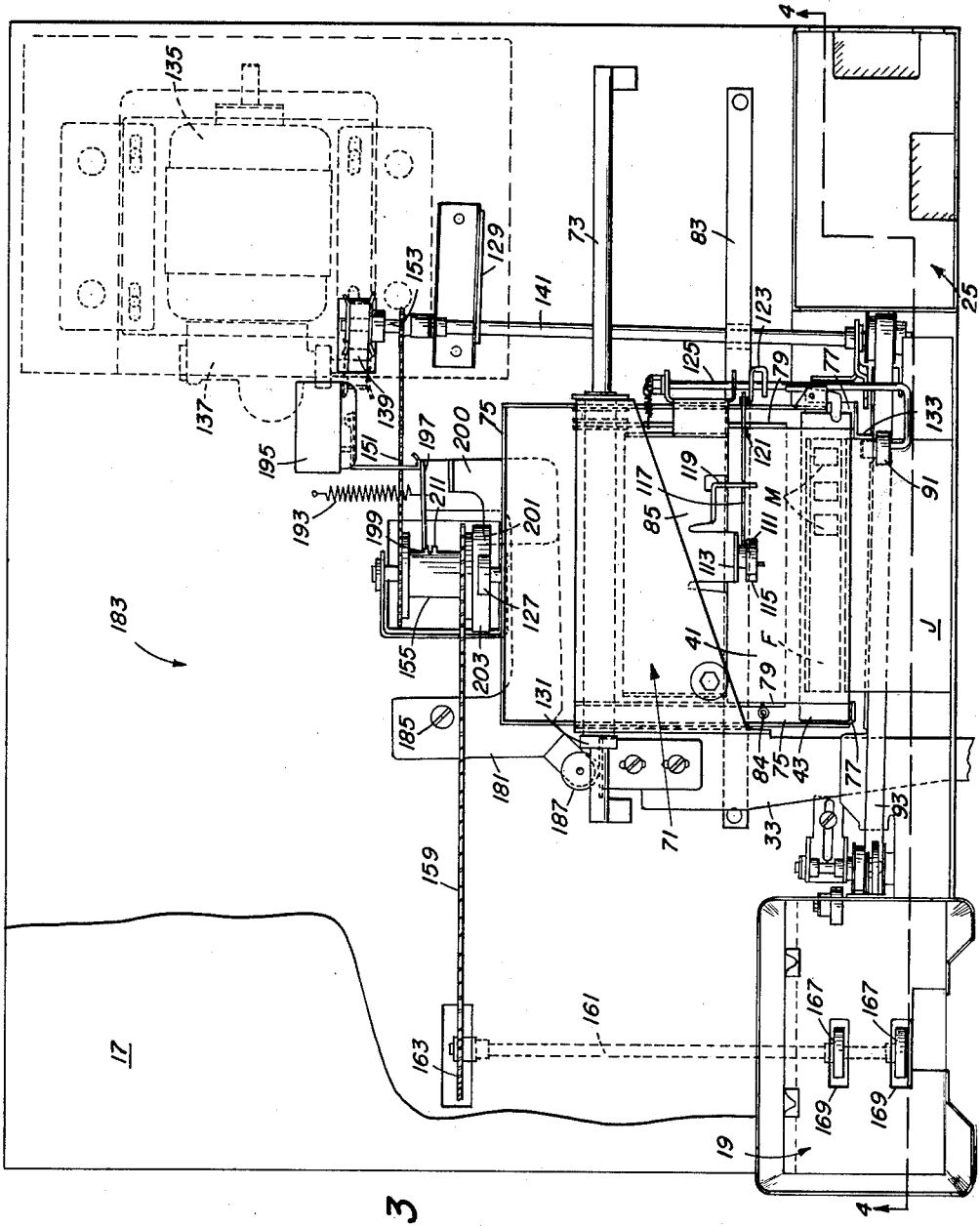

Feb. 11, 1964　　　C. E. SWING ETAL　　　3,120,783
FILM READER
Filed Sept. 11, 1961　　　　　　　　　　　　5 Sheets-Sheet 4
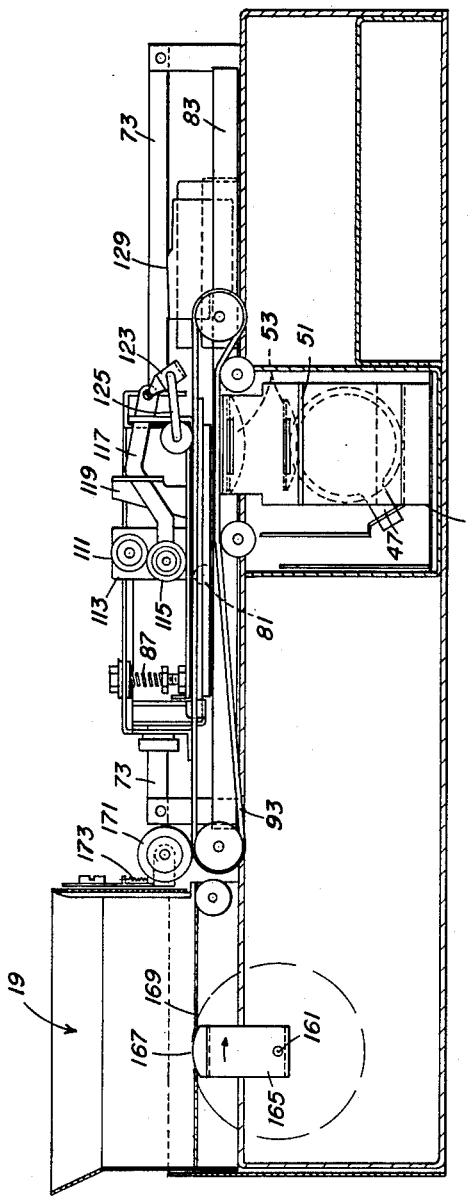
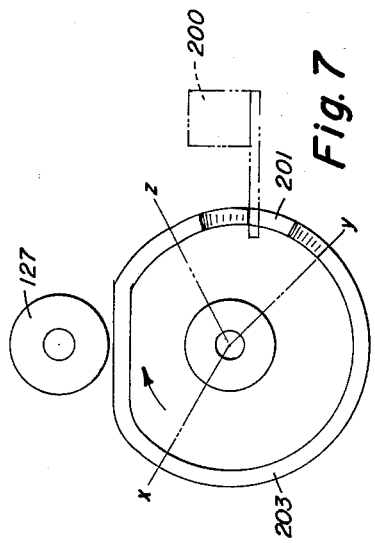
CHARLES E. SWING
ELMER O. WANGERIN
INVENTORS
BY R. Frank Smith
Paul W. Holmes
ATTORNEYS Feb. 11, 1964 C. E. SWING ETAL 3,120,783
FILM READER
Filed Sept. 11, 1961 5 Sheets-Sheet 5

CHARLES E. SWING
ELMER O. WANGERIN
INVENTORS

BY
ATTORNEYS

United States Patent Office 3,120,783
Patented Feb. 11, 1964

3,120,783
FILM READER
Charles E. Swing and Elmer O. Wangerin, Rochester, N.Y., assignors to Eastman Kodak Company, Rochester, N.Y., a corporation of New Jersey
Filed Sept. 11, 1961, Ser. No. 137,272
5 Claims. (Cl. 88—28)

This invention relates to a film reader and more particularly to an apparatus for viewing images carried in discrete members.

The film reader of the present invention is especially useful for viewing image bearing strips which have been mounted in transparent film carrying members or jackets, as they are known in the trade, and a preferred embodiment of the reader which is designed to utilize such jackets will be described herein although it will be readily appreciated by those skilled in that art that the reader with little or no modification could be used with other forms of data bearing members and would still provide many of the advantages which are obtained with the hereinafter disclosed construction. The term "jacket" or "jackets" as referred to herein is intended to define a two-ply structure preferably formed at least in part of clear plastic material separated by one or more spacers to provide one or more slots into which a strip or strips of image bearing material, e.g. film may be slidably positioned. One of the slots is usually, but not necessarily, located adjacent to one longitudinal edge of the jacket. In the past, one of the difficulties presented by the use of film jackets has been the necessity for manual manipulation of each jacket to position the same in the viewing apparatus. This requires certain operator dexterity and skill, and in certain instances is a tedious time consuming operation. The film reader of the present invention overcomes this difficulty and renders film jackets more convenient to use. Film jackets can now be a valuable aid in applications where sequential reference to information contained on films in successive jackets is required. Thus, broadly the film reader of the present invention comprises means for sequentially feeding jackets containing image bearing strips to a projection station where the images on the strip are projected onto a viewing screen and for ejecting each jacket from the projection station as the successive jacket is fed thereto. The film reader incorporates means for automatically locating each successively fed jacket in the projection station with any desired portion of the images on the strip associated with that jacket positioned in image projecting relation to the optical projection system of the reader. Another aspect of the present invention is the incorporation of structure to guide the jackets when in the projection station to scan the images contained on the strip associated with such jackets.

The primary object of the present invention is, therefore, to provide an apparatus for viewing data associated with discrete data bearing members.

Another object of the present invention is to provide projection apparatus for intermittently advancing successive data bearing members from a supply thereof to a viewing station and halting each member in the station with its data bearing portion positioned for viewing.

Still another object of the present invention is to provide in a viewing apparatus means for sequentially advancing successive data bearing members from a supply to a projection station with a data bearing portion of the members positioned in image projecting relation to the optical projection system of the reader and means for ejecting the members from the projection station in timed relation to the advance of successive members.

Yet another object of the present invention is to provide an apparatus for viewing images associated with discrete jackets which comprises a projection screen, a hopper for receiving a supply of jackets, a projection station at which images are projected onto the screen for viewing and a receptacle for receiving the jackets after viewing all conveniently positioned in substantially aligned spaced relation below and in front of the viewing screen of the viewing apparatus, and means for sequentially moving successive jackets from the hopper to projection station to the receptacle.

Another object of the present invention is to provide a viewing apparatus comprising a station for receiving discrete data bearing members for viewing and including means for guiding the members in data scanning movement in the station.

Still other objects and advantages of the present invention will become readily apparent to those skilled in the art from the following description with reference to the drawings in which the like characters denote like parts and wherein:

FIG. 1 is a front elevation view showing the lower portion of the film reader of the present invention;

FIG. 2 is a vertical section view taken substantially along the line 2—2 of FIG. 1;

FIG. 3 is a view of the interior of the film reader with a portion of the housing removed for clarity of illustration;

FIG. 4 is a vertical section view taken substantially along line 4—4 of FIG. 1;

FIG. 7 is a front view of the cam looking along line 7—7 of FIG. 6 which cam controls the sequential operation of the carriage mechanism.

Figure 8:
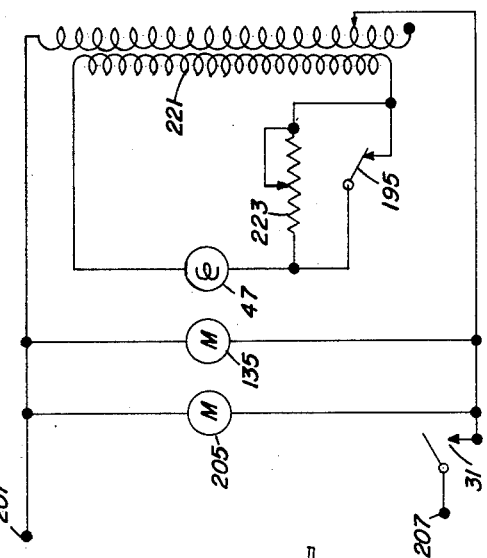
FIG. 8 is a schematic wiring diagram for the reader.

The reader of the present invention comprises a viewing screen 11 which is mounted in front housing 13 at the front of the reader with the upper portion of the screen recessed therein so that the overlying portion of the front housing will shade the screen from extraneous light from the environs. The film reader has a back cover 15 and a lower housing 17 which substantially enclose the operating mechanism of the apparatus. A hopper 19 which is adapted to receive a plurality of jackets J is positioned at the left side of the reader adjacent to the viewing screen 11 and below the lower edge thereof. A weight in the form of a plate follower 23 is positioned on top of the jackets J and tends to urge the lowermost jacket towards the bottom of the hopper 19. A receiving hopper or receptacle 25 is located on the other side of the film reader. Several jackets J are shown in FIG. 1 in the receptacle 25. The film reader has a focusing projection lens 26 which is mounted behind the lens cover 27 and is adjusted by means of the focusing lever 29. The numeral 31 designates the main switch which turns the film reader on and off and the numeral 33 designates the control lever which is used to actuate the mechanism to feed the lowermost jacket from the hopper 19 into the projection station and from the projection station into the receiving hopper 25 as will be hereinafter fully described.

Figure 5:
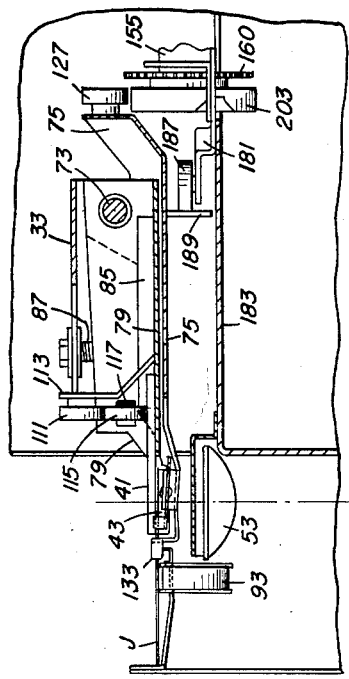
FIG. 5 is a cross-sectional view taken along the line 5—5 in FIG. 3 and further illustrates the card carriage mechanism.
Figure 6:
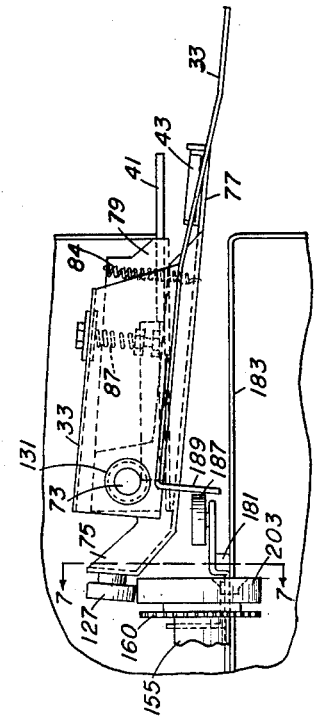
FIG. 6 is a side elevation view of the card carriage mechanism showing a portion thereof in one of its displaced positions.

The projection station of the film reader is located between a pair of glass flats. The upper flat 41 is fixed longitudinally with respect to the optical axis (indicated by the broken line in FIG. 2) and the lower flat 43 is movable between one position spaced from the upper flat 41 (shown in FIG. 6) to permit a jacket to be positioned therebetween and a second position in which the jacket is clamped between the lower flat and the upper flat (see FIG. 5). The optical projection system of the film reader comprises a reflector 45, a projection lamp 47, condensing lenses 49, a condenser projection mirror 51 and condenser lenses 53, all of which are mounted on a tray 55, which is slidably received in the lower portion of the reader, as illustrated in FIG. 2 and FIG. 4, to facilitate cleaning of lenses and/or replacement of projection lamp. The projection system further comprises, in addition to flats 41 and 43, a projection lens 26, a small projection mirror 59, a large projection mirror 61 and, of course, the viewing screen 11.

As was mentioned above, the film reader incorporates means for scanning the various images M carried on the film strips F which are mounted in the slots of jackets J, as shown, for example in FIG. 3. The mechanism which provides this scanning movement is referred to generally as the carriage and is designated by the numeral 71. The carriage 71 comprises a control lever 33, a guide rod 73, a lower flat holder 75 having a tray 77 formed on the extending portions thereof for receiving the lower flat 43, an upper flat holder 79 and the upper and lower flats 41 and 43 respectively. Both the lower flat holder 75 and the upper flat holder 79 are mounted for movement longitudinally of rod 73. Such movement permits movement of the jacket J with respect to the optical axis so that any of the images M can be viewed as desired. While control lever 33 and holder 75 are also mounted for pivotal movement with respect to rod 73, a roller 81 is mounted under the lower surface of holder 79 for engagement with rail 83 to thereby support upper flat holder 79 in a fixed horizontal plane. A spring 84 is connected between the upper and lower flat holders and urges the lower flat 43 toward upper flat 41. A plate 85 is mounted on the upper flat holder 79 and serves several purposes, one being to position the upper flat holder 79 with respect to rod 73 and the optical projection system, another being to mount a compression spring 87 which resiliently urges the control lever 33 into its uppermost position (in other words, urged counterclockwise with respect to rod 73 in FIG. 6), still another being to lock upper flat 41 in position on the upper flat holder 79 and yet another being to provide a support for the carriage roller 91.

Carriage roller 91 is resiliently urged toward the conveyor belt 93 by means of a tension spring 95. The purpose of the carriage roller is to urge the jacket J downwardly into contact with the belt 93 when the jacket is being ejected from between the glass flats 41 and 43 so that the jacket will be carried along by the belt and advanced to the receptacle 25. The locking mechanism for the upper flat 41 comprises a first roller 111 which is mounted for rotation on a resilient upstanding portion 113 of the plate 85 and a second roller 115 which is mounted on a lever 117. Roller 115 has a diameter which is slightly greater than the distance between the lower periphery of roller 111 and the upper surface of the upper flat 41 and is located slightly over center from roller 111. Lever 117 is guided for movement parallel to the rod 73 by a guide member 119 and a guide slot 121 formed in the side portion of upper flat holder 79. Lever 117 is pivotally mounted to bracket 123 which is fixed on the shaft 125. Shaft 125 carries the carriage roller 91 on the other end thereof. Thus, upon clockwise (as viewed in FIG. 4) turning movement of shaft 125, the roller 115 is pulled from under roller 111 and raised from the surface of the upper flat 41 so that the flat can be removed for cleaning and roller 91 is raised off of the belt 93. When carriage 71 is moved to the far right as viewed in FIG. 3, follower roller 127 which is rotatably mounted on the back of lower flat holder 75 rides up on fixed cam 129 and causes lower flat 43 to pivot away from upper flat 41 to further facilitate removal and cleaning of the flats. A stop 131 on the left end of rod 73, as viewed in FIG. 3, positions the carriage 71 so that the first image M on the strip F in the jacket J is located in image projecting relation to the optical projection system when the jacket is advanced by the belt 73 into contact with jacket stop 133. Stop 133 is carried with jacket stop 133. Stop 133 is carried with jacket stop 133. Stop 133 is carried on the right hand end of tray 77 as viewed in FIG. 3.

The numeral 135 designates the main drive motor for the film reader. The motor drives the belt 93 continuously whenever main switch 31 is closed, i.e. in its "on" position, through a gear reducer 137, a drive belt 139 and drive shaft 141. A chain 151 driven from a sprocket 153 mounted on shaft 141 drives a clutch 155 through sprocket 157. Another chain 159 carried by a sprocket 160 on the other end of clutch 155 is utilized to drive shaft 161 through a sprocket 163. The shaft 161 carries two card feeding kickers 165 having shoes 167 formed of a high friction material carried on the end thereof for engaging and ejecting the lowermost jacket J from the hopper 19 as the kickers rotate through apertures 169 formed in the bottom of the hopper. Roller 171 is mounted for vertical movement with respect to belt 93 and is urged by a spring 173 into peripheral engagement with the surface of the belt so that when a jacket J is ejected from the hopper 19 it is pressed into contact with the surface of the belt by the roller 171 and carried by the belt into the projection station between flats 41 and 43.

A lever 181 is pivotably mounted on the base plate 183 of the reader by means of a stud 185 and carries a roller follower 187 on one end thereof for engagement with a depending portion 189 of the control lever 33. The other end of lever 181 is resiliently urged by means of spring 193 toward cam-operated microswitch 195 which causes the projection lamp 47 to be dimmed during feed of the jackets J into the projection station. A projection 197 on lever 181 is positioned to engage a stop 199 formed on clutch 195 when the lever 181 is in its normal position as maintained by spring 193 and a corner of a supplemental plate 200 carried by lever 181 engages a notch 201 formed in a cam 203 which is mounted on the force of sprocket 160. When lever 181 and plate 200 are so engaged with clutch 155 and cam 203 respectively, the movement of chain 151 is not transmitted through the clutch to chain 159. However, when the control lever 133 is depressed, lever 181 pivots about stud 185 as a result of the engagement of roller 187 with portion 189 and the projection 197 is moved off of stop 199 and plate 200 is disengaged from notch 201 allowing the clutch to engage so that movement is transmitted to chain 159. The position taken by projection 197 is such as to engage the other stop 211 on the clutch and thereby prevent more than one revolution of the clutch. Thus only one jacket is ejected from the hopper 19 by the kickers 165. Upon release of the control lever 133 the lever is raised by spring 187 and projection 197 is moved over the engage stop 199 by spring 193 and plate 200 engages notch 201 in cam 203 thereby closing the circuit through switch 195 and resetting the parts for the next actuation of lever 33.

As mentioned above, cam 203 is mounted on the face of the sprocket 160 and is driven as a unit therewith when the clutch is actuated. The periphery of the cam 203 is shaped as shown in FIG. 7 to impart certain movements to the lower flat 43 as a result of the contact of follower 127 with the periphery of cam 203. As shown in FIG. 7, the cam 203 is in its stopped position whereat the lower flat 43 is in jacket clamping relation to the upper flat 41. When rotation of the cam carries the point designated by the character $x$ under the follower 127 the lower flat 43 is moved to its lowermost position wherein the jacket J in the photographic station drops with the assistance of the carriage roller 91 below the stop 133 and is moved by the belt 93 to the receiving hopper 25. At this same time the next jacket is being fed by the belt 93 toward the projection station between the flats 41 and 43. Just before that next jacket approaches stop 133 the cam 160 has rotated to the position where the follower 127 is at $y$ and at this point radius of the cam periphery changes gradually so that the lower flat 43 is raised slightly by spring 84 from its lowermost position and stop 133 is moved into the path of the jacket J and will cause the same to be halted with the first image M positioned in image projecting relation in the projection station. Thereafter the continued rotation of cam 203 carries the periphery thereof beyond point $z$ with respect to the follower 127 and at this time the radius of the cam surface is such that the lower flat 43 is raised by spring 84 into jacket clamping relation to the upper flat, thereby raising the jacket from the moving belt 93.

In the schematic diagram of FIG. 8, it will be seen that main switch 31, when closed, i.e. when in its "off" position, will connect the drive motor 135 across the A.C. supply at the terminals 207 to run continuously. The blower motor 205 which is not shown in the other figures of the drawings, is used to circulate cooling air around the projection lamp 47. Both the motor 205 and the projection lamp 47 are energized whenever the main switch 31 is closed. The numeral 221 designates the transformer from which the projection lamp 47 is energized. A variable resistor 223 is connected in parallel with microswitch 195 and operates to dim the projection lamp when the microswitch 195 is opened during feed of jackets from the hopper 19 as previously explained.

From the foregoing description of the film reader of the present invention and its operation, it will be apparent to those skilled in the art that we have devised a convenient and novel mechanism for handling and feeding image carrying jackets or other data bearing members from a supply thereof to a viewing station for viewing and to a receiving hopper. The invention has been described in detail with particular reference to preferred embodiments thereof, but it will be understood that variations and modifications can be effected within the spirit and scope of the invention as described hereinabove and as defined in the appended claims.

Having now particularly described our invention, what we desire to secure by Letters Patent of the United States and what we claim is:

1. A projection reader for viewing data on discrete data bearing members comprising:
  (a) a housing;
  (b) an inclined viewing screen recessed in the front of the housing so that the housing at least partially shades the screen from the environs;
  (c) a projection station located in the front of said housign below said viewing screen;
  (d) two transparent flats, one of which has a surface for locating said members in said station when in surface contact therewith, and the other of said flats being mounted opposite said one flat surface for movement between one position relatively remote from said one flat wherein said members are free to move therebetween and a second position in close proximity to said one flat wherein the members are clamped in said station between the flats;
  (e) a light source and projection optics mounted relative to said station for projecting onto said screen images of said members when in said station;
  (f) a hopper provided in said housing space from and aligned with said station for storing a plurality of said members to be viewed;
  (g) a receptacle in the housing spaced from and disposed in substantial alignment with said hopper and said station for receiving said members after being viewed;
  (h) a continuously driven endless conveyor positioned to engage the undersurface of and to thereby support said members for movement in a substantially horizontal plane from the hopper to said station and from the station to said receptacle;
  (i) means for selectively dispensing said members one by one from said hopper onto said conveyor and, simultaneously with such dispensing, for ejecting from said station any member then in the station;
  (j) means for positioning the second flat in said one position in timed relation to the movement of said members by said conveyor whereby the conveyed members are free to move between the flats;
  (k) means for moving said second flat to said second position in synchronism with the arrival of each conveyed member in image projecting alignment with said station; and
  (l) means for halting the movement of each member by said conveyor with a data bearing portion of such member aligned in image projecting relation to said projection optics whereby the member is clamped in such image projecting relation in said station by the movement of said second flat to said second position.

2. A projection reader in accordance with claim 1 and further comprising means for guiding said flats when the second flat is in said second position for movement as a unit in a substantially horizontal plane to scan the data bearing portions of a member when clamped between said flats.

3. A projection reader for viewing images which have been recorded on strip material and mounted on discrete transparent members comprising:
  (a) two supports;
  (b) a projection station located between said supports;
  (c) means for projecting the images on said members for viewing when in said station;
  (d) a continuously driven endless conveyor positioned to engage the undersurface of and to thereby support said members for movement in a substantially horizontal plane
    (1) to said station, with at least one of the images on each member so conveyed, aligned in image projecting relation to the station; and
    (2) from said station to a location spaced therefrom;
  (e) means for selectively feeding said members from a supply thereof onto said conveyor;
  (f) means for ejecting from said station any member located therein simultaneously with the feeding movement of another of said members from said supply onto said conveyor;
  (g) means for mounting one of said supports with one surface thereof disposed to locate one of said members in said station when such member is in surface contact with said one surface;
  (h) means for mounting the other of said supports for movement between a first position, relatively remote from said one support wherein the members are freely movable on the conveyor between the supports, and a second position in relatively close proximity to said one support wherein the members are clamped in said station between said supports; and
  (j) means for moving said second support to said second position in synchronism with the arrival of the conveyed members in aligned image projecting relation to said station.

4. A projection reader in accordance with claim 3 and wherein said second support when in said second position is disposed above the supporting periphery of said conveyor and one of said members when clamped between said supports is raised out of contact with said conveyor.

5. A projection reader in accordance with claim 3 and further comprising means for guiding said supports when the second support is in said second position for movement as a unit in a substantially horizontal plane to scan the data bearing portions of a member when clamped between said supports.

References Cited in the file of this patent
UNITED STATES PATENTS

| | | |
|---|---|---|
| 1,801,546 | Enderle | Apr. 21, 1931 |
| 2,701,979 | Pratt et al. | Feb. 15, 1955 |
| 2,741,960 | Oldenboom | Apr. 17, 1956 |
| 2,849,916 | Nolan | Sept. 2, 1958 |
| 2,880,647 | Swinnerton | Apr. 7, 1959 |
| 2,937,569 | Wilton | May 24, 1960 |